United States Patent [19]
Cuesta

[11] Patent Number: 4,959,604
[45] Date of Patent: Sep. 25, 1990

[54] PROCESS FOR ULTRA-RAPIDLY CHARGING A SEALED NICKEL-CADMIUM STORAGE BATTERY

[75] Inventor: Rosendo Cuesta, Saint Loubes, France

[73] Assignee: Societe Anonyme dite: SAFT, France

[21] Appl. No.: 278,547

[22] Filed: Dec. 1, 1988

[30] Foreign Application Priority Data

Sep. 9, 1988 [FR] France ................................ 88 11794

[51] Int. Cl.$^5$ ............................................. H01H 10/44
[52] U.S. Cl. .......................................... 320/20; 320/32; 320/39
[58] Field of Search ....................... 320/20, 21, 23, 24, 320/32, 37, 39, 40

[56] References Cited

U.S. PATENT DOCUMENTS

| | | | |
|---|---|---|---|
| 3,597,673 | 8/1971 | Burkett et al. | 320/20 X |
| 3,732,481 | 5/1973 | Mas | 320/20 X |
| 3,816,806 | 6/1974 | Mas | 320/20 |
| 4,392,101 | 7/1983 | Saar et al. | 320/20 |
| 4,629,965 | 12/1986 | Fallon et al. | 320/23 |

Primary Examiner—Steven L. Stephan
Assistant Examiner—Kristine Peckman
Attorney, Agent, or Firm—Kenyon & Kenyon

[57] ABSTRACT

A process for charging a sealed nickel-cadium storage battery in a time on the order of three to fifteen minutes. Charging is performed at a constant charging voltage which is lower than the voltage at which hydrogen is released at the negative electrode of the storage battery. Charging is terminated when the charging current intensity of the storage battery registers a significant increase following a gradual decrease during the charging process.

3 Claims, 4 Drawing Sheets

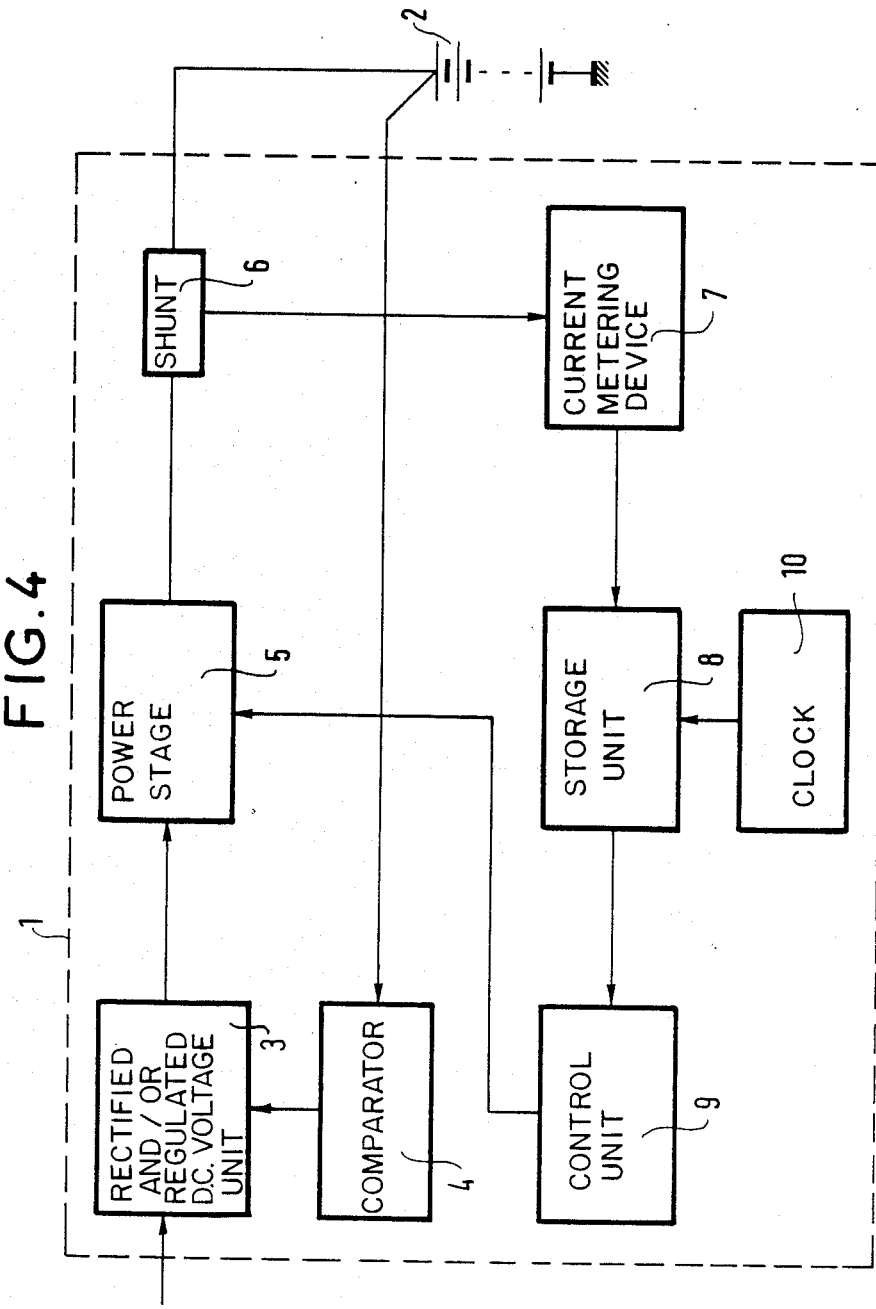

PROCESS FOR ULTRA-RAPIDLY CHARGING A SEALED NICKEL-CADMIUM STORAGE BATTERY

The invention relates to a so-called ultra-rapid charging process i.e., on the order of three to fifteen minutes, for a sealed nickel-cadmium storage battery.

Sealed nickel-cadmium storage batteries are conventionally implemented in the form of modules having a cylindrical or polyhedral shape and are used in a known manner, either as individual units or in packages containing several identical modules.

One advantage for the user of such sealed nickel-cadmium storage batteries is that they may be rapidly recharged.

In conventional chargers, recharging is accomplished in approximately one hour's time using charging intensities on the same order as the value of the storage battery capacity, for example, one or two amperes for a storage battery having a capacity of 1.4 ampere-hours.

This type of storage battery provides a great deal of flexibility and is appropriate for use in many applications, particularly in transceivers and cordless tools.

However, in certain recent applications, and more specifically for models, heavy-duty cordless tools, cellular telephones, it has become apparent that there is a need for ultra-rapid charging in an even shorter time, on the order of several minutes.

Because of the method of operation of sealed storage batteries, the implementation of an ultra-rapid charging process requires extremely reliable and accurate means of monitoring and detecting the end of the charge in order to ensure safety for the user and to provide sustained performance levels for these storage batteries over time.

To achieve this objective, the invention proposes a so-called ultra-rapid charging process for a sealed nickel-cadmium storage battery.

According to one characteristic of the invention, charging is accomplished in a time period on the order of three to fifteen minutes and is achieved at a charging voltage which is lower than the voltage at which hydrogen is released in gaseous form; and charging is stopped as soon as the current intensity registers a significant increase during the charging process, following a decrease during the charging process.

The characteristics and advantages of the invention are disclosed in the description which follows and which refers to the appended drawings, wherein:

FIG. 4 is a schematic drawing of a battery charger implementing the process according to the invention.

Figure 1:
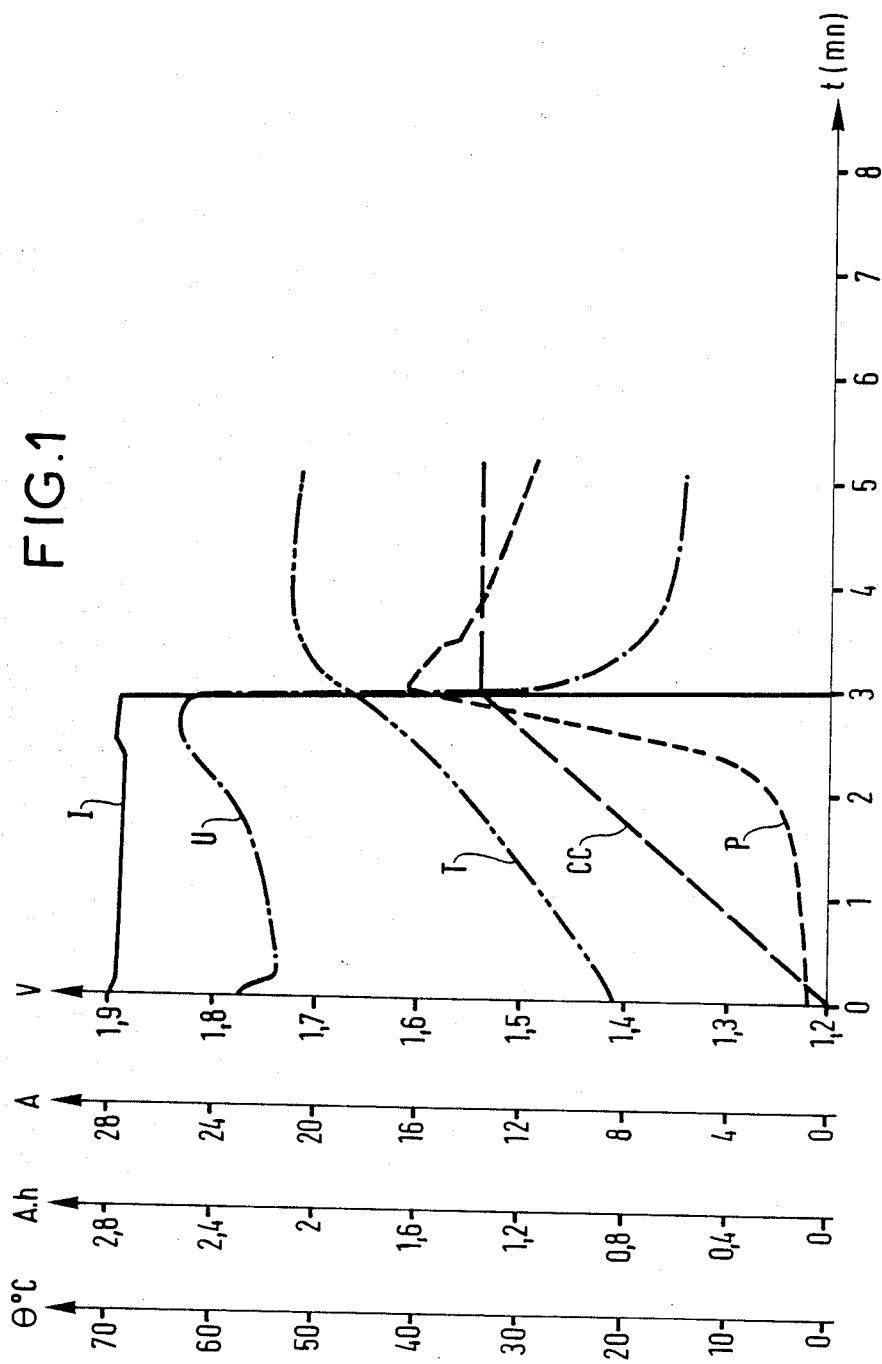
FIG. 1 shows the evolution of the parameters of voltage U, of temperature T, of pressure P, of intensity I and of the charged capacity CC as a function of time, in a storage battery undergoing a rapid charge.

For practical reasons, most users prefer storage batteries which are sealed, thereby preventing the release of gases and leakage of fluids during normal operation.

In a known manner, achieving a full charge of a storage battery is a two-phase process wherein, during the first phase, there occurs an oxidation reduction in the active materials of the electrodes, wherein the said oxidation reduction is endothermic and occurs without release of gases, under normal conditions. Subsequently, when all of the active material of the electrodes has been transformed, the storage battery enters an overcharge phase and the energy supplied causes oxygen to be released on the positive electrode and to be reduced on the negative electrode. This reaction, known as recombination, causes heating of the storage battery and an increase in internal pressure in the case of a sealed storage battery. The pressure varies as a proportional function of the charging intensity.

For safety reasons, sealed storage batteries are equipped with safety valves to limit their internal pressure to a value below the danger level, which is not attained under normal operating conditions.

The commonly accepted values at the end of a charge in a storage battery are, for example, a temperature of 45° C. and an internal pressure of less than 15 kg/cm$^2$.

In the case of ultra-rapid charging, which is accomplished, for example, in three minutes for a storage battery having a capacity of 1.4 ampere-hours and a standard format of Cs, the average intensity during the charge should be high, corresponding, for example, to 20 times the capacity of the storage battery to be charged.

The evolution of the voltage, temperature and internal pressure parameters of the storage battery during a charge at an ambient temperature of 20° C. is The diagram illustrating pressure in the storage battery shows that such pressure increases by 1 kg/cm$^2$ every 3 seconds during the final 30 seconds of the charge and very rapidly reaches the value at which the valves are opened.

The diagram illustrating voltage at the terminals of the storage battery being charged shows that voltage exceeds 1.80 V while charging at 20° C.

This value denotes the presence of hydrogen released at the negative electrode.

This phenomenon may be accentuated by lower ambient temperatures, by operation at low temperatures or by prolonged storage of the storage batteries prior to charging, and it is incompatible with sealed operation.

Indeed, the hydrogen produced within the storage battery cannot recombine, and the resulting increase in pressure has cumulative effects.

Therefore, it is necessary to control the internal pressure of the storage batteries in order to restrict it to values that are compatible with the valve opening value adopted for reasons of safety, to reduce the overcharging phase to a minimum, and to limit the charging voltage.

The principal known rapid charging systems provide for charging storage batteries at a constant intensity, which is adjusted or limited as a function of the stability desired.

The charging time is on the order of one hour and the charging intensity is approximately the same as the storage battery capacity.

In most instances, the end of charging is detected either by monitoring the duration of the charge, or the charging voltage of the storage batteries, or the temperature of the storage batteries, or by the negative variation of the voltage at the end of the charge.

In the first instance, a counting device is initialized at the onset of the charging process and the charge is interrupted after a predetermined time period. This device does not ordinarily provide a means of limiting the charging voltage. In addition, it presents a disadvantage in that it allows substantially overcharging of the storage batteries, particularly if the initial charge state is not zero, for example, in the case of consecutive charges, or if the storage batteries have lost capacity due to aging.

In the second instance, the voltage of the storage battery is compared to a predetermined threshold which corresponds to the stop of charge instruction.

The disadvantages of this process lie in the fact that the voltage of storage batteries receiving a charge is a function of numerous parameters such as the intensity of the charging current, ambient temperature, aging of the storage batteries; the criterion selected is therefore relatively unreliable and difficult to apply and, in sum, it is seldom used.

In addition, in the case of charging at low temperature or charging storage batteries which have been stored for long periods, voltage spikes occur at the start of the charge and may temporarily interrupt the charging process.

In the third case, the temperature of the storage batteries is measured by a thermal detection device which causes charging to stop as soon as the temperature reaches a predetermined value, for example, 40° C. to 50° C.

In this case, the ambient temperature exerts a significant impact on the temperature of the storage batteries, thereby making it impossible to use storage battery temperature as the sole criterion for ending a charge.

In addition, the response time is very long, making it impossible to take into consideration the rapid increase in internal pressure of the storage batteries after the end of the first charging phase, for very high charging intensities.

Finally, the recharging conditions are poor at ambient temperatures approaching the temperature at which the end of charge instruction is generated, because even a slight increase in the storage battery temperature at the beginning of the recharging process will cause charging to be interrupted.

The fourth instance involves the use of the voltage reduction in the storage batteries being charged which occurs when battery temperature increases during transition from the charging phase to the overcharging phase.

This reduction is due to the negative temperature coefficient of the nickel-cadmium pair.

This characteristic is appropriate for charges lasting approximately one hour but not for ultra-rapid charging; indeed, the evolution of the storage battery voltage during the charging process does not allow for continuous use of the V parameter, as shown in the drawing of FIG. 1, representing an ambient temperature of +20° C. In this case, an adequate voltage signal appears only when the internal pressure reaches 16 kg/cm².

In addition, in this case, no limit is placed on the charging voltage of the storage batteries.

Furthermore, at the ambient temperature in question, a significant decrease in voltage at the beginning of the charging process is observed; this phenomenon, which routinely occurs when charging at very high intensities or after prolonged storage, results in sporadic operation of the end of charge detection system.

In this case, the risk of excess pressure in the storage batteries and the consequent potential for explosion cannot be ruled out.

Thus, the invention proposes to limit the charging voltage of the storage batteries to values at which there is no release of hydrogen and to employ a signal to indicate completion of rapid charging, thereby providing a means to control the internal pressure within the storage batteries so as to restrict it to values below the valve opening levels.

Figure 2:
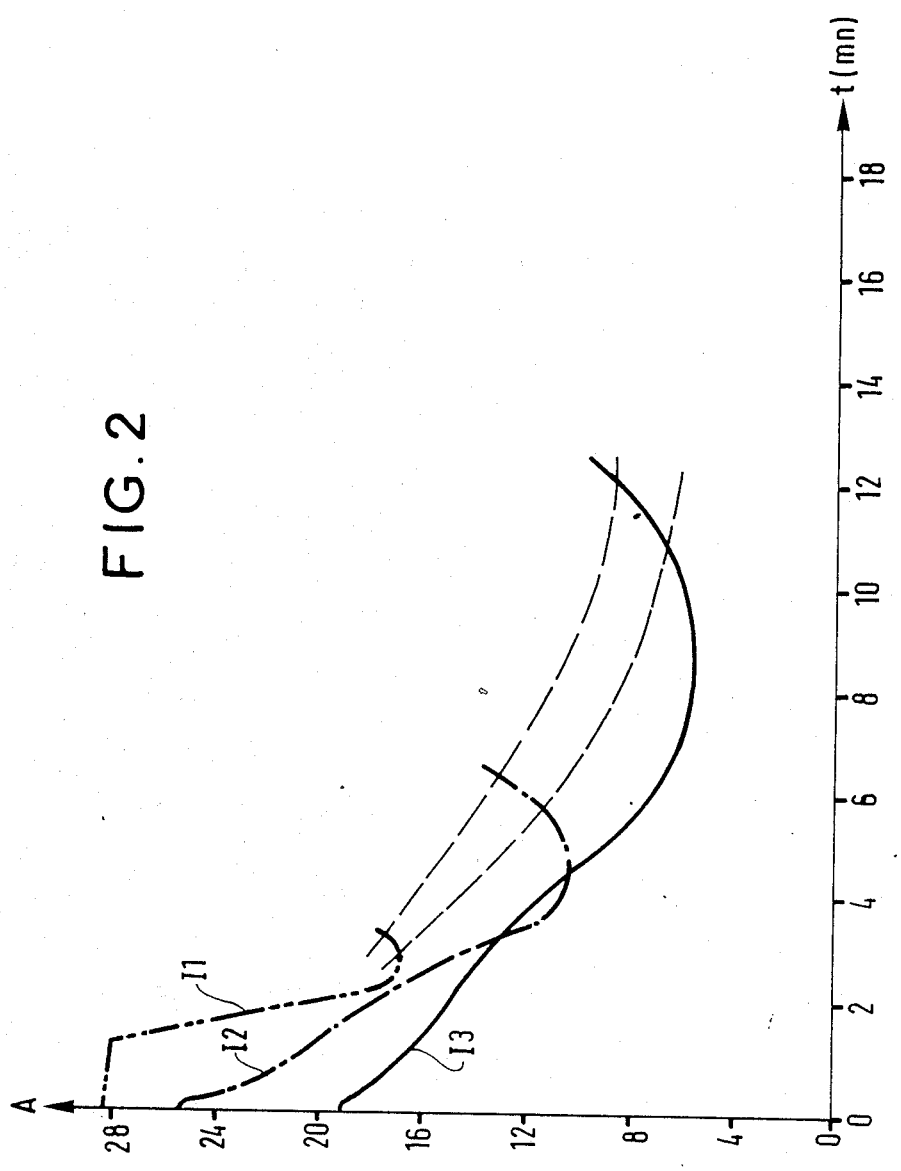
FIG. 2 shows the evolution of the charging current intensity I1, I2 or I3 for a storage battery subjected to a constant charging voltage of value $U1 = 1.60$ volts, $U2 = 1.64$ volts, $U3 = 1.67$ volts.

FIG. 2 shows, as a function of time, the evolution of the charging intensity of a storage battery subjected to constant voltages that are lower than the voltage at which hydrogen is released.

It is apparent that, on the one hand, the intensity of the charging current traversing a given nickel-cadmium storage battery being charged at a given voltage begins at a high value at the start of the charge, then falls to a minimum level which corresponds almost exactly to the end of the endothermic phase; and, on the other hand, once it has reached a minimum level, the intensity of the charging current again increases to a value at which the pressure reached in the storage battery exceeds a pressure threshold, because of oxygen generation. Two pressure thresholds of ten bar and fifteen bar respectively are depicted in FIG. 2, and, as clearly illustrated in this figure, for each of the curves showing the charging current intensity as a function of the charging time for the three charging voltages of 1.60 volts, 1.64 volts and 1.70 volts, the first, then the second pressure thresholds of 10 and 15 bar respectively are rapidly attained, once the charging current has fallen to a minimum level. The higher the charging voltage, the faster the pressure thresholds are reached.

Consequently, according to the invention, the charging voltage is limited to a value ranging from 1.60 to 1.67 volts per storage battery, or, more specifically, per module, in a temperature range of 0° to 40° C., in order to prevent the release of hydrogen.

As clearly illustrated by the curves of FIG. 2, the intensity of the charging current which passes through a storage battery rapidly increases after it has fallen to a minimum level; this escalation is used to trigger the end of the rapid charging process, wherein a relative increase on the order of 0.5 to 1 ampere over the minimal value of the current is preferably selected as the threshold which triggers the end of the rapid charging process The charging current may then be completely eliminated or reduced to levels that are normal for the storage battery (less than one-tenth of its nominal capacity).

Figure 3:
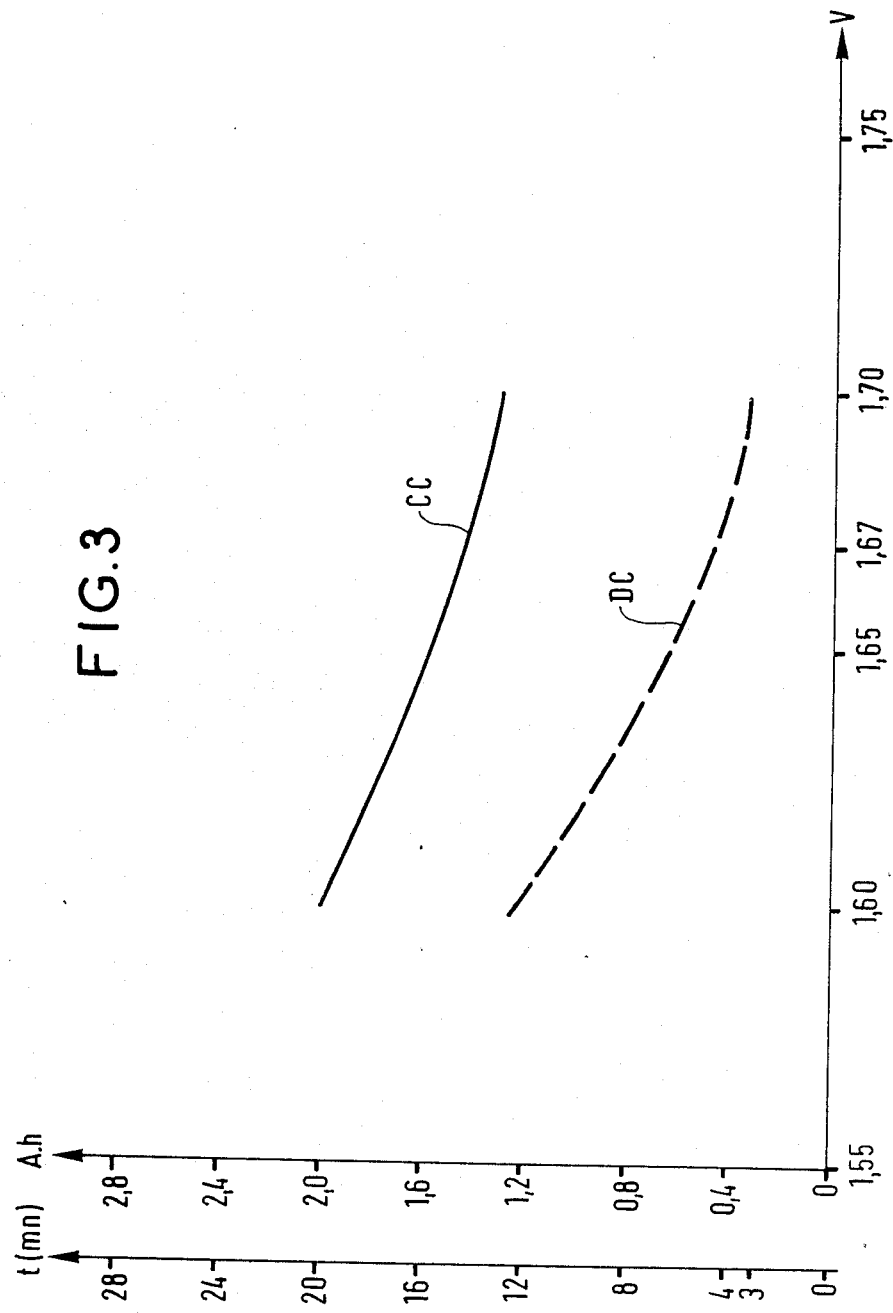
FIG. 3 shows the evolution of the charged capacity CC and the duration of the charge DC as a function of the charging voltage.

The two curves of FIG. 3 respectively show an example of the evolution of the charging period and of the charged capacity as a function of the charging voltage under the conditions described above, that is, with a constant charging voltage ranging from 1.60 to 1.70 volts inclusive, wherein the intensity of the charging current is limited to 28 amperes at a temperature of 20° C. when the internal pressure reaches a value of 15 kg/cm² for storage batteries having an ampere-hour capacity on the order of 1.25 to 2.

It is therefore possible to obtain a charge within 3 to 12 minutes with charging currents having maximum starting values on the order of 15 to 25 times the capacity of the storage battery to be charged.

Consequently, for a charge intended to be completed in a time frame of 3 to 15 minutes, using a maximum charging intensity on the order of 15 to 25 times the capacity of the storage battery to be charged, the charge is controlled by regulating the voltage, by limiting the charging voltage to a constant value ranging from 1.60 to 1.67 volts and by stopping the charge upon detection of a significant increase in the intensity of the current absorbed during the charge, for example, an increase on the order of 0.5 to 1 ampere.

A battery charger 1 as summarily described in conjunction with FIG. 4 provides a device for implementing the process in accordance with the invention.

This battery charger 1 is designed, in a conventional manner, to be connected, respectively, to the positive terminal of a storage battery 2 to be charged and to the negative terminal of this storage battery in a manner which is not shown, through a ground.

The charging voltage is applied to the terminals of the storage battery 2 by a unit 3 connected to a rectifier, which is ordinarily connected to an alternating current power source and which supplies direct voltage, or a direct current power source to a voltage regulator that sets the value of the said voltage, as a function of the signal received from a comparator 4 to which are applied both a prescribed voltage and the voltage at the terminals of storage battery 2.

The prescribed voltage in this case is set at a value ranging from 1.60 to 1.67 volts inclusive, as indicated in the foregoing.

The charging current is supplied by a power stage 5, which is regulated such that it supplies substantial charging current to the storage battery 2, wherein this current is limited, for example, to 28 amperes in the example described in the foregoing.

A shunt 6 connected to a conventional current metering device 7 provides a means to determine the value of the charging current supplied by the power stage to the storage battery 2, through the shunt 6.

The current metering device 7 is connected to a storage unit 8 which, in this instance, is connected to a clock 10 which cyclically records the measurements successively made by the current metering device 7, at the rate of one measurement per second, for example.

The increase in the charging current is detected by a unit 9 comprising a comparator which functions using the measurements recorded during a charging operation. The unit 9 acts on the output stage 5 and stops the charging process whenever the charging current increases to the preselected triggering value. It is understood that an appropriately programmed processor may be employed to process the measurement signals and to control the voltage regulator and the output stage.

The operation of the battery charger may then be considered to comprise three successive phases.

During the first phase, at the start of the charge, the battery is only partially charged and the voltage at its terminals is lower than the voltage supplied by the regulator-rectifier unit 3, wherein the charge occurs at the intensity limit of the battery charger 1, i.e. at 28 amperes in the example selected.

Then, the voltage at the storage battery terminals approaches the voltage supplied by the unit 3 which it attains while the charging current intensity decreases more or less rapidly as a function of the charge which has already accumulated and of the prevailing environmental conditions. The internal pressure and temperature of the storage battery thus vary only slightly.

The charging current then tends to increase once again after falling to a minimum, and a significant amount of oxygen would be released if the current increase were not detected, then stopped by terminating the rapid charging process.

The charging method proposed and the end of charge detection means may be associated with a device providing for an additional charge at an intensity ranging from a value corresponding to five one-hundredths of the capacity and a value corresponding to this ampere-hour capacity.

The termination of the additional charge is then determined by an auxiliary system such as a timer or a thermostat.

The addition of such safety systems to monitor the parameters of the storage battery nearly doubles the effectiveness of the control system from a safety standpoint; this is highly desirable for such ultra-rapid charges.

I claim:

1. A process for ultra-rapidly charging a sealed nickel-cadmium storage battery, wherein the charging process comprises:
   applying to the battery a charging voltage which is sufficient to complete the charging process in a time on the order of three to fifteen minutes but is lower than a voltage at which hydrogen is released in gaseous form, and
   terminating the charging voltage when charging current intensity registers a significant increase following a gradual decrease.

2. A charging process as claimed in claim 1, wherein the charging voltage supplied to the storage battery is limited to a value ranging from 1.60 to 1.67 volts inclusive.

3. A charging process as claimed in either claim 1 or claim 2, wherein the charging current is equal to a value of five to twenty-five times the capacity of the storage battery to be charged and wherein the said significant increase in current is on the order of 0.5 to 1 ampere.

* * * * *